United States Patent
Pham et al.

(10) Patent No.: US 7,276,306 B2
(45) Date of Patent: Oct. 2, 2007

(54) SYSTEM FOR THE CO-PRODUCTION OF ELECTRICITY AND HYDROGEN

(75) Inventors: Ai Quoc Pham, San Jose, CA (US); Brian Lee Anderson, Lodi, CA (US)

(73) Assignee: The Regents of the University of California, Oakland, CA (US)

( * ) Notice: Subject to any disclaimer, the term of this patent is extended or adjusted under 35 U.S.C. 154(b) by 150 days.

(21) Appl. No.: 10/388,141

(22) Filed: Mar. 12, 2003

(65) Prior Publication Data

US 2004/0180249 A1 Sep. 16, 2004

(51) Int. Cl.
*H01M 8/06* (2006.01)

(52) U.S. Cl. .......................... 429/19; 429/12; 429/17; 423/652

(58) Field of Classification Search ...................... None
See application file for complete search history.

(56) References Cited

U.S. PATENT DOCUMENTS

| | | | |
|---|---|---|---|
| 3,180,813 A | 4/1965 | Wasp et al. | |
| 4,657,829 A | 4/1987 | McElroy et al. | 429/19 |
| 5,342,702 A | 8/1994 | MacGregor | |
| 5,409,784 A | 4/1995 | Bromberg et al. | |
| 6,051,125 A | 4/2000 | Pham et al. | |
| 6,387,554 B1 | 5/2002 | Verykios | |
| 6,569,298 B2 * | 5/2003 | Merida-Donis | 204/263 |
| 6,887,601 B2 * | 5/2005 | Moulthrop et al. | 429/17 |
| 6,908,700 B2 * | 6/2005 | Iio | 429/17 |
| 2001/0002248 A1 | 5/2001 | Ukai et al. | |
| 2002/0017463 A1 | 2/2002 | Roberto | 204/551 |
| 2002/0058175 A1 | 5/2002 | Ruhl | |

FOREIGN PATENT DOCUMENTS

JP 10144332 5/1996

* cited by examiner

*Primary Examiner*—John S. Maples
(74) *Attorney, Agent, or Firm*—John P. Wooldridge; Ann M. Lee; John H. Lee

(57) ABSTRACT

Described herein is a system for the co-generation of hydrogen gas and electricity, wherein the proportion of hydrogen to electricity can be adjusted from 0% to 100%. The system integrates fuel cell technology for power generation with fuel-assisted steam-electrolysis. A hydrocarbon fuel, a reformed hydrocarbon fuel, or a partially reformed hydrocarbon fuel can be fed into the system.

10 Claims, 2 Drawing Sheets

SYSTEM FOR THE CO-PRODUCTION OF ELECTRICITY AND HYDROGEN

The United States Government has rights in this invention pursuant to Contract No. W-7405-ENG-48 between the United States Department of Energy and the University of California for the operation of Lawrence Livermore National Laboratory.

BACKGROUND

Fuel cells can efficiently convert fuel energy into electrical energy with low pollutant emissions. Since fuel cells are more efficient (40-60% efficient) than typical turbine or boiler power plants (40% efficient), the emissions of carbon dioxide are significantly reduced. Additionally, the emissions of nitrogen oxide pollutants from fuel cells are much lower than the emissions from typical power plants.

The steam reforming reaction converts a hydrocarbon fuel and water to the reactive products of carbon monoxide and hydrogen. A partially reformed fuel is formed when not all of the hydrocarbon is not converted to carbon monoxide and hydrogen. Most hydrogen is currently produced using the steam reforming of natural gas. This reaction is highly endothermic and requires several complex gas purification units (e.g., high temperature shift, low temperature shift, pressure swing absorption, etc.).

SUMMARY OF THE INVENTION

An object of the invention includes a system comprising: a means for producing hydrogen; and
a means for producing electricity.

Another object of the invention includes an apparatus comprising: a membrane having a cathode side and an anode side; means for supplying a gas to said cathode side; means for supplying a gas to said anode side; means for supplying a fuel to said anode side, wherein said fuel is selected from the group consisting of a fossil fuel, a reformed fossil fuel, and a partially reformed fossil fuel; and means for supplying an oxygen-containing gas to said cathode side.

Another object of the invention includes an apparatus comprising: a membrane having a cathode side and an anode side; means for supplying a gas to said anode side; means for supplying a gas to said cathode side; means for supplying steam to said cathode side; means for supplying an effluent from a high-temperature fuel cell to said anode side; and means for supplying fuel to said anode side, wherein said fuel is selected from the group consisting of a fossil fuel, a reformed fossil fuel, and a partially reformed fossil fuel.

A further object of the invention includes a method comprising: (a) feeding an oxygen-containing gas to the cathode side of a fuel cell; (b) simultaneously with step (a), feeding a fuel to the anode side of said fuel cell to produce and effluent from said anode side; (c) feeding said effluent to the anode side of a fuel-assisted steam electrolyzer; and simultaneously with step (c), feeding steam to the cathode side of said fuel-assisted steam electrolyzer to produce hydrogen.

DETAILED DESCRIPTION

Disclosed herein is a highly flexible and efficient system, hereinafter referred to as a COGEN system (for co-generation) that can produce hydrogen, electricity or hydrogen and electricity concurrently. The COGEN system is capable of generating hydrogen and electricity in any proportion, and has applications in both the centralized and distributed production of hydrogen and electricity. The COGEN system disclosed herein integrates fuel cell technology for power generation with fuel-assisted steam-electrolysis (hereinafter referred to as FASE) technology for hydrogen production. FASE technology is described in detail by Pham et al. in U.S. Pat. No. 6,051,125, which is hereby incorporated by reference. The fuel cell unit of the COGEN system produces electricity from the electrochemical reaction of oxygen and a hydrocarbon fuel (e.g., natural gas, methane, methanol, gasoline and diesel), a reformed hydrocarbon fuel and/or a partially reformed hydrocarbon fuel. The oxygen can be provided by air, an oxygen-enriched air, or oxygen gas. The FASE portion of the COGEN system produces hydrogen from the electrolysis of water by using electricity from the fuel cell and the fuel remaining in the fuel cell anode-side effluent. Fuel from another source may be fed into the FASE unit to supplement the fuel remaining in the fuel cell anode-side effluent. Steam and hydrogen are produced in the cathode-side effluent of the electrolyzer and are separated by condensing the steam to generate a stream of pure hydrogen.

Figure 1:
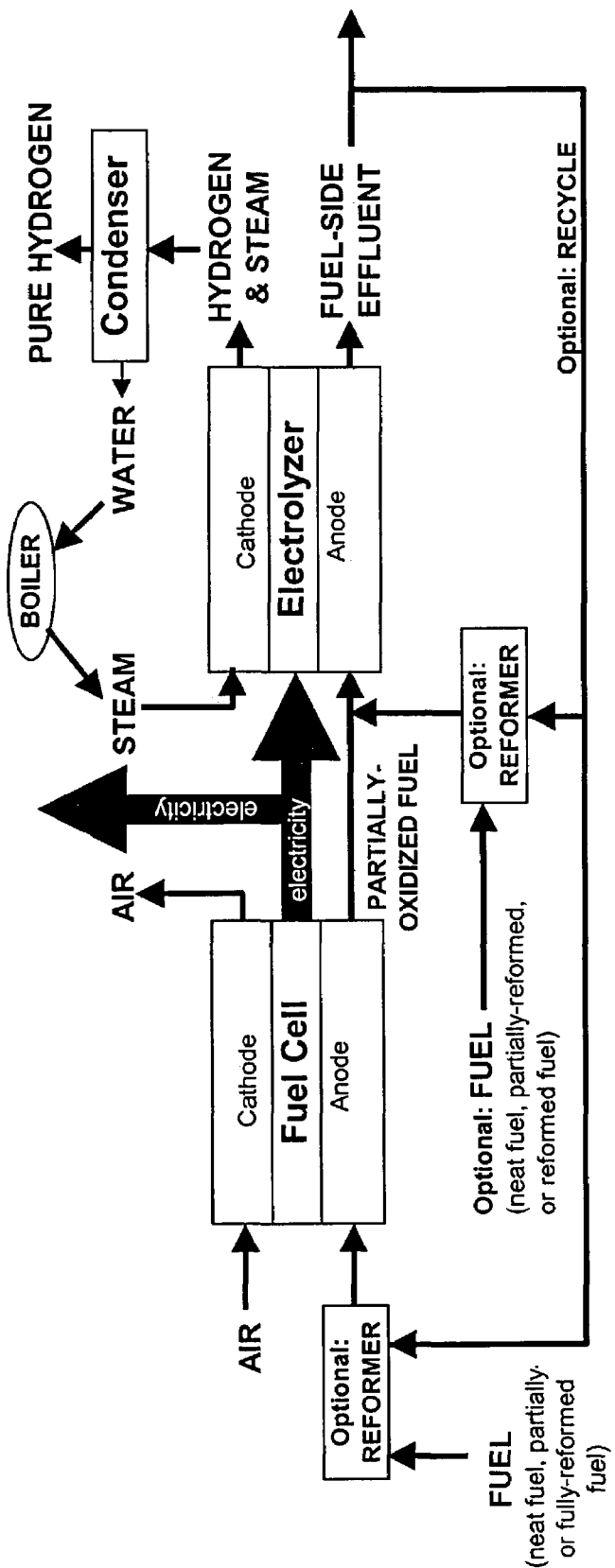
FIG. 1 shows a flow diagram of a COGEN system.
Figure 2:
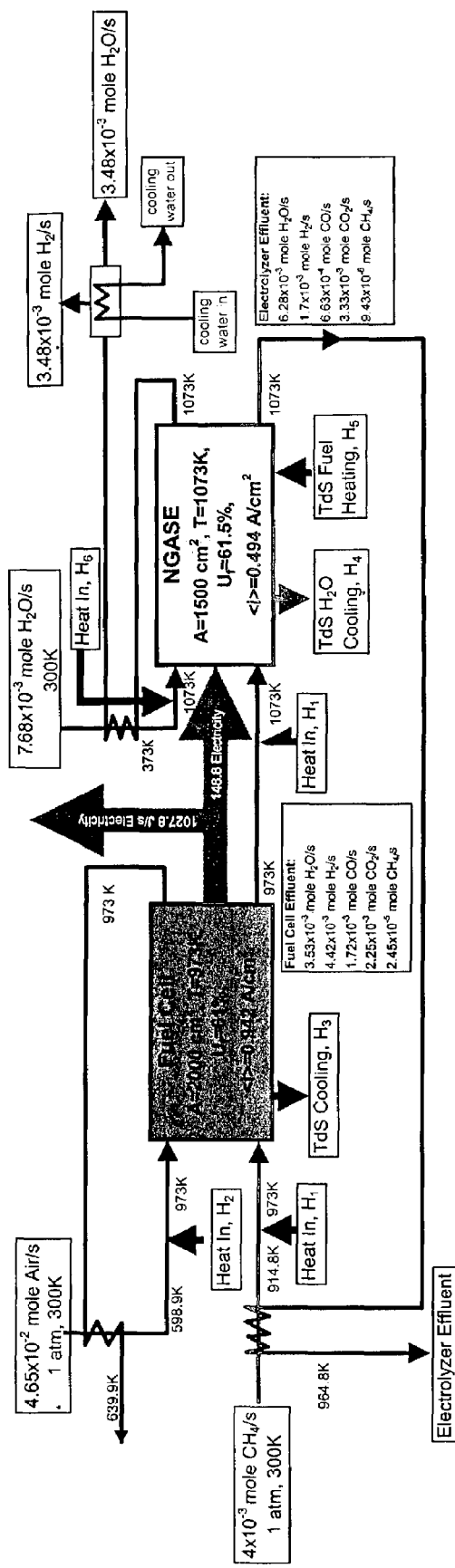
FIG. 2 shows a flow diagram of a COGEN system with operating conditions included.

FIG. 1 is a flow diagram of the COGEN system. Hydrocarbon fuels utilized by the COGEN system are typically utilized at 80% to 85%, wherein the percent utilization is defined as the ratio of the amount of fuel reacted over the initial amount of fuel introduced. Higher fuel utilization is difficult to achieve because of the loss in electromotive driving force due to fuel dilution. The remaining fuel is thus either burnt to generate heat in an after-burner, recycled or a portion can be burnt and the remaining portion recycled. Referring to FIG. 1, the partially oxidized fuel from the fuel cell anode is directly fed to the FASE anode. The fuel utilization in the fuel cell unit can be anywhere from 0 to 80 percent. The majority of the remaining fuel is consumed in the FASE in such a way that the total fuel utilization of the COGEN system is as high as possible, typically 85%. The extent to which fuel is utilized in the fuel cell unit of the COGEN system depends on the ratio between the demand for electricity generation and that for hydrogen production. The ability to vary the fuel utilization in each unit of the COGEN system (i.e., the fuel cell unit and the FASE unit) provides the system with great flexibility. Fuel remaining in the FASE anode can be burnt for heat generation or it can be recycled. FIG. 2 is a flow diagram of the COGEN system that includes effective operating conditions.

Another embodiment of the COGEN system, which allows for greater flexibility in output, involves the addition of fuel between the fuel cell and the FASE. In general, if fuel utilization is high in the fuel cell unit, then the exhaust exiting the fuel cell unit is composed of predominantly carbon dioxide ($CO_2$), steam and some unburnt fuel (i.e., $H_2$, CO, $CH_4$). This fuel cell exhaust may be used to reform additional fuel that can be added before the exhaust enters the FASE anode. Utilizing the fuel cell exhaust to reform fuel eliminates the need to provide steam at high temperature and thus, increases the overall efficiency of the COGEN system. The addition of additional fuel allows both the fuel cell unit and the FASE unit to be run simultaneously at high production rates because the hydrogen production rate of the FASE unit does not depend on the fuel utilization of the fuel cell unit.

All high-temperature fuel cells such as Solid Oxide Fuel Cells (SOFCs) and Molten Carbonate Fuel Cells (MCFCs) are suitable for integration with a FASE unit. Typical operating conditions using a SOFC integrated with a FASE are as follows:

An oxygen-containing gas (e.g., air or oxygen enriched air) is fed to the fuel cell cathode while a fuel source (e.g., fuel, reformed fuel or partially reformed fuel) is fed to the fuel cell anode.

The oxygen is electrochemically reduced to oxygen ions at the fuel cell cathode. The oxygen ions then diffuse from the fuel cell cathode through an electrolyte membrane to the fuel cell anode where the oxygen ions react with the fuel source to produce the fuel cell exhaust which comprises carbon dioxide, steam, hydrogen and carbon monoxide.

The fuel cell exhaust is then fed to the anode side of the FASE and steam is fed to the cathode side of the FASE.

The steam decomposes to hydrogen gas and oxygen ions and the oxygen ions diffuse from the cathode side of the FASE through an electrolyte membrane to the anode side of the FASE and react with the fuel cell exhaust to produce hydrogen and steam.

The hydrogen is then separated from the steam with a condenser.

An additional benefit to integrating a fuel cell with a FASE to form a COGEN system is gain in efficiency. Because the reactions occurring in the fuel cell unit can generate large quantities of heat, whereas the net reactions occurring in the FASE unit can be slightly endothermic due to the heat requirement for splitting steam, the heat generated by the fuel cell unit can be used to supplement the heat required by the FASE unit. Thus, utilizing this transfer of heat makes the COGEN system much more efficient than two stand-alone units.

All kinds of fossil fuels can be used as the fuel source for the COGEN system. Natural gas is effective and has an already available infrastructure. Using a fuel processor prior to introducing the fuel source into the fuel cell unit allows fuel sources such as propane, butane, LNG, gasoline, diesel, biomass, coal and gas, to also be effective. Other fuel sources not listed explicitly may also be effective for use in the COGEN system if processed properly prior to use.

Both the fuel cell unit and the FASE unit of the COGEN system are modular and, therefore, allow for size flexibility in the COGEN system. Each unit can be operated at zero percent, allowing for the maximum flexibility in production rate. For instance, typically when the demand in electricity is low, conventional competing technologies such as gas turbines, internal compression engines and the like must be slowed down or operated at idle position, which results in higher operating cost. With the COGEN system, when demand in electricity is low, the system can be shifted to produce more hydrogen or vice versa. Generally, the demands in electricity and hydrogen are in opposite phase, enabling the COGEN system to operate at maximum rate most of the time.

The fuel cell unit and the FASE unit of the integrated COGEN system can comprise several stacks assembled together. Each individual fuel cell or FASE can operate at a temperature independent from the other fuel cells or FASEs in the stack.

All numbers expressing quantities of ingredients, constituents, reaction conditions, and so forth used in the specification and claims are to be understood as being modified in all instances by the term "about". Notwithstanding that the numerical ranges and parameters setting forth the broad scope of the subject matter presented herein are approximations, the numerical values set forth in the specific examples are reported as precisely as possible. Any numerical value, however, inherently contain certain errors necessarily resulting from the standard deviation found in their respective testing measurements.

While various materials, parameters, operational sequences, etc. have been described to exemplify and teach the principles of this invention, such are not intended to be limited. Modifications and changes may become apparent to those skilled in the art; and it is intended that the invention be limited only by the scope of the appended claims.

The invention claimed is:

1. A system comprising:
    at least one fuel cell for generating electricity, wherein each fuel cell of said at least one fuel cell comprises a fuel cell anode, a fuel cell cathode and a fuel cell electrolyte membrane fixedly connected to and between said fuel cell anode and said fuel cell cathode;
    means for providing oxygen to said fuel cell cathode;
    means for providing fuel to said fuel cell anode, wherein at least one fuel cell anode of said at least one fuel cell produces fuel cell effluent that comprises fuel cell anode non-oxidized fuel;
    at least one fuel-assisted electrolyzer for generating hydrogen and steam, wherein each fuel-assisted electrolyzer of said least one fuel-assisted electrolyzer comprises an electrolyzer anode, an electrolyzer cathode and an electrolyzer electrolyte membrane fixedly connect to and between said electrolyzer anode and said electrolyzer cathode;
    means for providing said fuel cell anode non-oxidized fuel to at least one electrolyzer anode of said at least one fuel-assisted electrolyzer; and
    means for providing said electricity to said one or more fuel-assisted electrolyzers of said at least one fuel-assisted electrolyzer.

2. The system recited in claim 1, wherein the production of hydrogen equals up to 100% of the total system output of hydrogen plus electricity.

3. The system recited in claim 1, wherein the production of electricity equals up to 100% of the total system output of hydrogen plus electricity.

4. The system recited in claim 1, wherein one or more fuel cells of said at least one fuel cell comprises a solid oxide fuel cell (SOFC).

5. The system recited in claim 1, wherein said at least one fuel-assisted electrolyzer comprises at least two fuel-assisted electrolyzers operating in series at temperatures independent from one another.

6. The system recited in claim 1, wherein said at least one fuel cell comprises at least two fuel cells operating in series at temperatures independent from one another.

7. The system recited in claim 1, wherein at least one said electrolyzer anode produces electrolyzer effluent including electrolyzer non-oxidized fuel, wherein said system further comprises means for providing said electrolyzer non-oxidized fuel to at least one said fuel cell anode.

8. The system recited in claim 1, further comprising means for providing fuel, in addition to said means for providing said fuel cell anode non-oxidized fuel to said electrolyzer anode.

9. The system recited in claim 1, wherein said electrolyzer anode produces electrolyzer effluent including electrolyzer non-oxidized fuel, wherein said system comprises means for providing said electrolyzer non-oxidized fuel to said fuel cell anode.

10. The system recited in claim 1, wherein said electrolyzer cathode produces a mixture of hydrogen and steam, said system further comprising a condenser for separating said hydrogen from said steam and converting said steam to water, said system further comprising means for providing said water to said electrolyzer cathode.

* * * * *